(12) United States Patent
Tani et al.

(10) Patent No.: US 12,353,644 B2
(45) Date of Patent: Jul. 8, 2025

(54) DISPLAY CONTROL SYSTEM FOR PROVIDING INFORMATION OF AN IMAGE OF AN OBJECT AND METHOD THEREOF

(71) Applicant: SHARP KABUSHIKI KAISHA, Sakai (JP)

(72) Inventors: Naoki Tani, Sakai (JP); Yusuke Konishi, Sakai (JP); Hiroaki Okumoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/130,819

(22) Filed: Apr. 4, 2023

(65) Prior Publication Data

US 2023/0244327 A1 Aug. 3, 2023

Related U.S. Application Data

(63) Continuation of application No. 17/220,289, filed on Apr. 1, 2021, now Pat. No. 11,650,673.

(30) Foreign Application Priority Data

Apr. 7, 2020 (JP) .................................. 2020-068984
Apr. 7, 2020 (JP) .................................. 2020-068985

(51) Int. Cl.
*G06F 3/0346* (2013.01)
*G06T 3/40* (2024.01)
*G06T 3/60* (2024.01)

(52) U.S. Cl.
CPC ............. *G06F 3/0346* (2013.01); *G06T 3/40* (2013.01); *G06T 3/60* (2013.01)

(58) Field of Classification Search
CPC ....... G06F 3/0346; G06F 3/0304; G06T 3/40; G06T 3/60
See application file for complete search history.

(56) References Cited

U.S. PATENT DOCUMENTS

2006/0152489 A1\* 7/2006 Sweetser ............... G06F 3/0325
345/158
2013/0265330 A1\* 10/2013 Goto .................. G02B 27/0172
345/632

(Continued)

FOREIGN PATENT DOCUMENTS

| JP | 2006127004 A | \* | 5/2006 |
| JP | 2013149106 A | | 8/2013 |
| JP | 2017010228 A | | 1/2017 |

OTHER PUBLICATIONS

The English Translation of JPO Office Action dated Sep. 19, 2023 for JP Patent Publication No. JP2020068984A.

(Continued)

*Primary Examiner* — David D Davis
(74) *Attorney, Agent, or Firm* — ScienBiziP, P.C.

(57) ABSTRACT

A display control system according to the present disclosure includes a cross-section display which, when an operation device moves in a direction away from a display device and overlaps a virtual plane at a position separated from the display device by a predetermined distance, causes the display device to display the object image including a cut plane obtained by cutting the operation device at the virtual plane.

9 Claims, 14 Drawing Sheets

(56) References Cited

U.S. PATENT DOCUMENTS

| | | | | |
|---|---|---|---|---|
| 2015/0062161 A1* | 3/2015 | Kim | ................ | G06T 19/006 |
| | | | | 345/633 |
| 2015/0363980 A1* | 12/2015 | Dorta | ................ | G06F 3/04883 |
| | | | | 345/419 |
| 2016/0196692 A1* | 7/2016 | Kjallstrom | ............ | G06T 19/006 |
| | | | | 345/633 |
| 2017/0075436 A1* | 3/2017 | Cook | ................ | G06F 1/1637 |
| 2017/0344112 A1* | 11/2017 | Wilson | ................ | G06F 3/0304 |
| 2019/0057550 A1* | 2/2019 | Aurongzeb | ............ | G06F 3/012 |
| 2020/0089313 A1* | 3/2020 | Himane | ................ | G06F 3/016 |

OTHER PUBLICATIONS

Non-final Rejection dated Mar. 28, 2022 for U.S. Appl. No. 17/220,289 which is the parent application of the instant application.

Final Rejection dated Sep. 26, 2022 for U.S. Appl. No. 17/220,289 which is the parent application of the instant application.

Notice of Allowance dated Jan. 13, 2023 for U.S. Appl. No. 17/220,289 which is the parent application of the instant application.

* cited by examiner

DISPLAY CONTROL SYSTEM FOR PROVIDING INFORMATION OF AN IMAGE OF AN OBJECT AND METHOD THEREOF

INCORPORATION BY REFERENCE

This application is based upon and claims the benefit of priority from the corresponding Japanese Patent Applications No. 2020-068984 filed on Apr. 7, 2020, and No. 2020-068985 filed on Apr. 7, 2020, the entire contents of which are incorporated herein by reference.

The present disclosure relates to a display control system and a display control method.

BACKGROUND

Conventionally, there has been proposed a system in which a computer graphics (CG) image of an object to be viewed is presented on a display device in accordance with the movement of a replica (model, doll) that imitates the shape of the object to be viewed created as CG data. According to this system, it is possible to present an image viewed from any direction that the viewer desires to see on the display device.

However, although the conventional system can change the orientation of the CG image on the display device in association with the movement of the replica, it is difficult to present detailed information (cross-section information, description, explanation, and the like) relating to the object to be viewed to the viewer in association with the movement of the replica. In particular, when the object to be viewed is an art object or the like, it is desirable that detailed information relating to the art object can be presented to the viewer.

SUMMARY

An object of the present disclosure is to provide a display control system which changes the orientation of an object image of an operation object displayed on a display device in association with the orientation change of an operation device, and which can display detailed information of the operation object, and a display control method thereof.

A display control system according to an aspect of the present disclosure changes an orientation of an object image of an operation object displayed on a display device in association with an orientation change of an operation device, and includes a cross-section display which, when the operation device moves in a direction away from the display device and overlaps a virtual plane at a position separated from the display device by a predetermined distance, causes the display device to display the object image comprising a cut plane obtained by cutting the operation device at the virtual plane.

Further, a display control system according to an aspect of the present disclosure changes an orientation of an object image of an operation object displayed on a display device in association with an orientation change of an operation device, and incudes a marker detector that detects a marker set at a specific position on the object image, and an information presenter that, when the marker is detected by the marker detector, presents specific information associated with the detected marker.

A display control method according to another aspect of the present disclosure changes an orientation of an object image of an operation object displayed on a display device in association with an orientation change of an operation device, and when the operation device moves in a direction away from the display device and overlaps a virtual plane at a position separated from the display device by a predetermined distance, executes by one or more processors to cause the display device to display the object image including a cut plane obtained by cutting the operation device at the virtual plane.

Further, a display control method, according to another embodiment of the present disclosure, changes an orientation of an object image of an operation object that is displayed on a display device in association with an orientation change of an operation device. The method includes detecting a marker that is set at a specific position of the object image and presenting, when the marker is detected, specific information associated with the detected marker, where detecting the marker and presenting the specific information are executed by one or more processors.

A recording medium, according to another aspect of the present disclosure, stores a program for changing an orientation of an object image of an operation object displayed on a display device in association with an orientation change of an operation device. When the operation device moves in a direction away from the display device and overlaps a virtual plane at a position separated from the display device by a predetermined distance, the program, when executed by one or more processors, cause the display device to display the object image including a cut plane obtained by cutting the operation device at the virtual plane.

Further, a recording medium, according to another embodiment of the present disclosure, stores a program for changing an orientation of an object image of an operation object displayed on a display device in association with an orientation change of an operation device. The program, when executed by one or more processors, cause the one or more processors to detect a marker that is set at a specific position of the object image and present, when the marker is detected, specific information associated with the detected marker.

According to the present disclosure, in a display control system that changes the orientation of an object image of an operation object displayed on a display device in association with the orientation change of an operation device, it is possible to display detailed information of the operation object.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will now be described with reference to the accompanying drawings for the purpose of understanding the present disclosure. It should be noted that the following embodiments are examples that embody the present disclosure, and do not limit the technical scope of the present disclosure.

Display Control System 100

Figure 1:
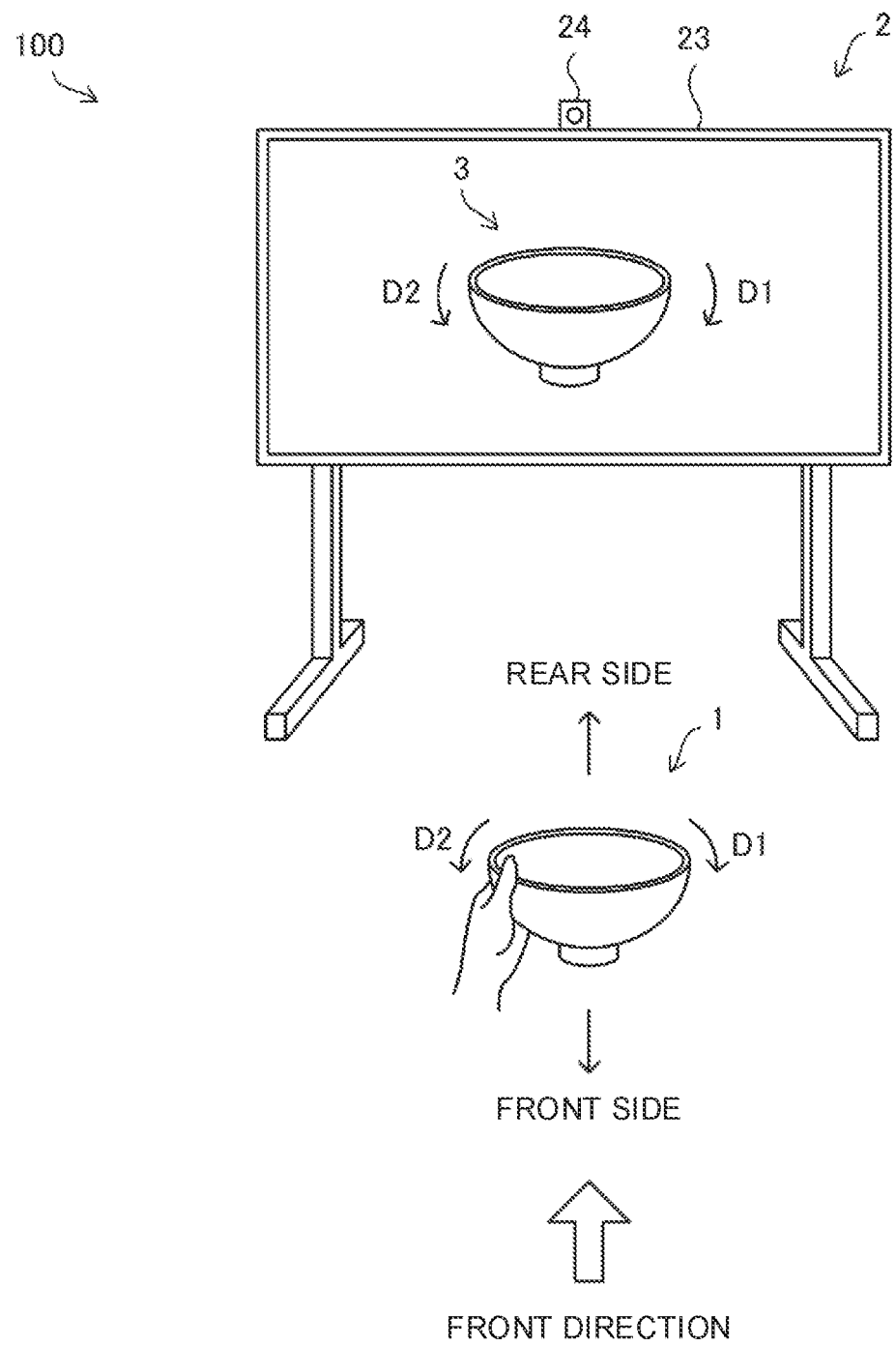
FIG. 1 is a schematic diagram illustrating a configuration of a display control system according to an embodiment of the present disclosure.
Figure 2:
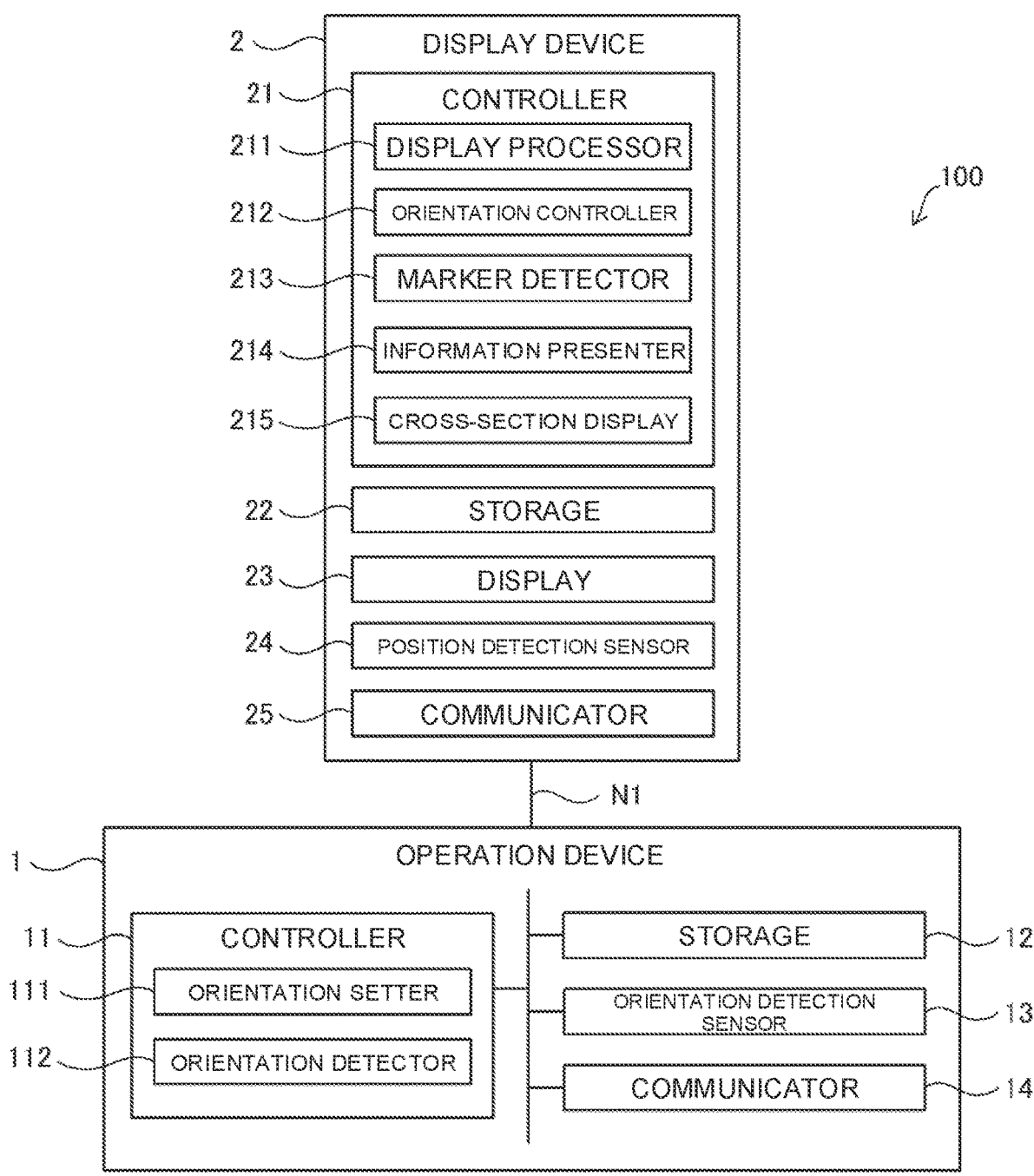
FIG. 2 is a block diagram illustrating the configuration of the display control system according to the embodiment of the present disclosure.

As illustrated in FIGS. 1 and 2, a display control system 100 according to an embodiment of the present disclosure includes an operation device 1 and a display device 2. The operation device 1 and the display device 2 can communicate with each other via a communication network N1 such as a wireless local area network (LAN) or a wired LAN. The operation device 1 is an example of an operation device of the present disclosure, and the display device 2 is an example of a display device of the present disclosure.

The display control system 100 can change the orientation (posture or attitude) of an object image 3 of an operation object displayed on the display device 2 in association with the orientation change of the operation device 1 having a shape simulating the operation object. For example, the operation object is an art object, the object image 3 is a three-dimensional image of the art object, and the operation device 1 is a replica (model) of the art object. In the present embodiment, a pottery tea bowl will be described as an example of the art object. The operation device 1 is, for example, a replica having the same material, shape, size, weight, texture, or the like as the tea bowl.

For example, as illustrated in FIG. 1, when a user (viewer) holds and rotates the operation device 1 (replica of the tea bowl) in the D1 direction, the display control system 100 rotates the object image 3 displayed on the display device 2 in the D1 direction according to the user's operation. Further, for example, when the user holds and rotates the operation device 1 in the D2 direction, the display control system 100 rotates the object image 3 in the D2 direction according to the user's operation. Further, for example, when the user extends her or his arm while holding the operation device 1 to move the operation device 1 in a direction away from her or his face (rear side), that is, when the user brings the operation device 1 closer to the display device 2 side, the display control system 100 displays the object image 3 with a reduced size on the display device 2. Furthermore, for example, when the user folds her or his arm while holding the operation device 1 to move the operation device 1 in a direction closer to her or his face (front side), that is, when the user moves the operation device 1 away from the display device 2, the display control system 100 displays the object image 3 with an enlarged size on the display device 2.

As described above, the operation device 1 is a controller capable of changing the orientation of the object image 3 displayed on the display device 2 according to the operation of the user. The art object (for example, a tea bowl) is an example of an operation object according to the present disclosure. Further, the object image 3 is an example of an object image of the present disclosure.

In the present embodiment, the display control system 100 corresponds to a display control system according to the present disclosure, but the display control system according to the present disclosure may be realized by the operation device 1 alone or the display device 2 alone.

Operation Device 1

Figure 3:
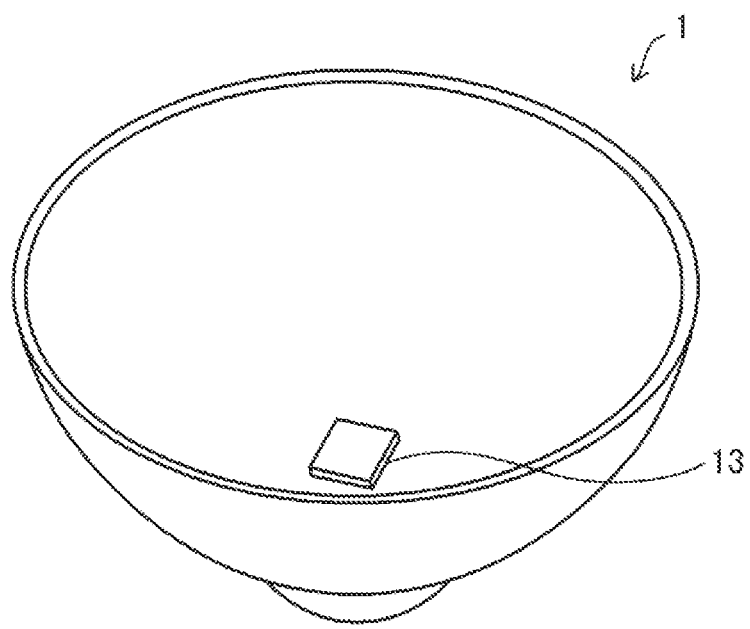
FIG. 3 is a view illustrating an appearance of an operation device according to the embodiment of the present disclosure.

As illustrated in FIG. 2, the operation device 1 includes a controller 11, a storage 12, an orientation detection sensor 13, a communicator 14, and the like. Various processing executed by the operation device 1 may be executed by one or more processors in a distributed manner. FIG. 3 illustrates an external view of the operation device 1. In the present embodiment, the operation device 1 is a replica of a tea bowl.

The communicator 14 is a communication interface for connecting the operation device 1 to the communication network N1 by wire or wirelessly and executing data communication according to a predetermined communication protocol with an external device such as the display device 2 via the communication network N1.

The orientation detection sensor 13 is a sensor for detecting the orientation of the operation device 1, and includes a gyro sensor, an acceleration sensor, a geomagnetic sensor, and the like. For example, the orientation detection sensor 13 detects an orientation change such as the rotation or inclination of the operation device 1, and outputs a detection signal to the controller 11. The orientation detection sensor 13 is mounted on the operation device 1. In the present embodiment, for example, as illustrated in FIG. 3, the orientation detection sensor 13 is fixed to the bottom portion inside the tea bowl. Note that the orientation detection sensor 13 may be covered with a lid so as not to be seen from the outside, or may be built in the operation device 1.

The storage 12 is a non-volatile storage such as a hard disk drive (HDD), a solid state drive (SSD) or a flash memory for storing various kinds of information. The storage 12 stores a control program such as a display control program for causing the controller 11 to execute display control processing (see FIG. 12) to be described later. For example, the display control program is non-temporarily recorded on a computer-readable recording medium such as a universal serial bus (USB), a compact disc (CD) or a digital versatile disc (DVD). Then, the display control program is read by a reading device (not illustrated) such as a USB drive, a CD drive or a DVD drive electrically connected to the operation device 1, and then is stored in the storage 12. Further, the display control program may be downloaded from a server accessible from the operation device 1, and then stored in the storage 12.

The controller 11 includes control devices such as a central processor unit (CPU), a read only memory (ROM) and a random access memory (RAM). The CPU is a processor for executing various kinds of arithmetic processing. The ROM is a non-volatile storage in which control programs such as a basic input output system (BIOS) and an operation system (OS) for causing the CPU to execute various arithmetic operations are stored in advance. The RAM is a volatile or non-volatile storage for storing various kinds of information, and is used as a temporary storage memory (work area) for various kinds of processing executed by the CPU. Then, the controller 11 controls the operation device 1 by executing various control programs stored in advance in the ROM or the storage 12 by the CPU.

Specifically, as illustrated in FIG. 2, the controller 11 includes various types of processors such as an orientation setter 111 and an orientation detector 112. Note that the controller 11 functions as the orientation setter 111 and the orientation detector 112 by executing various processing according to the display control program by the CPU. Further, a part or all of the processors in the controller 11 may be configured by an electronic circuit. Note that the display control program may be a program for causing a plurality of processors to function as the various types of processors.

The orientation setter 111 sets the orientation of the operation device 1 to the facing orientation in which the operation device 1 faces the user. Specifically, the orientation setter 111 registers the orientation (facing orientation) of the operation device 1 at the position where the user faces the operation device 1, that is, at the position where the user places at the front of the operation device 1. For example, the orientation setter 111 acquires and registers the coordinates and the inclination of the operation device 1 in the X, Y and Z directions in the facing orientation from the orientation detection sensor 13.

Figure 4A:
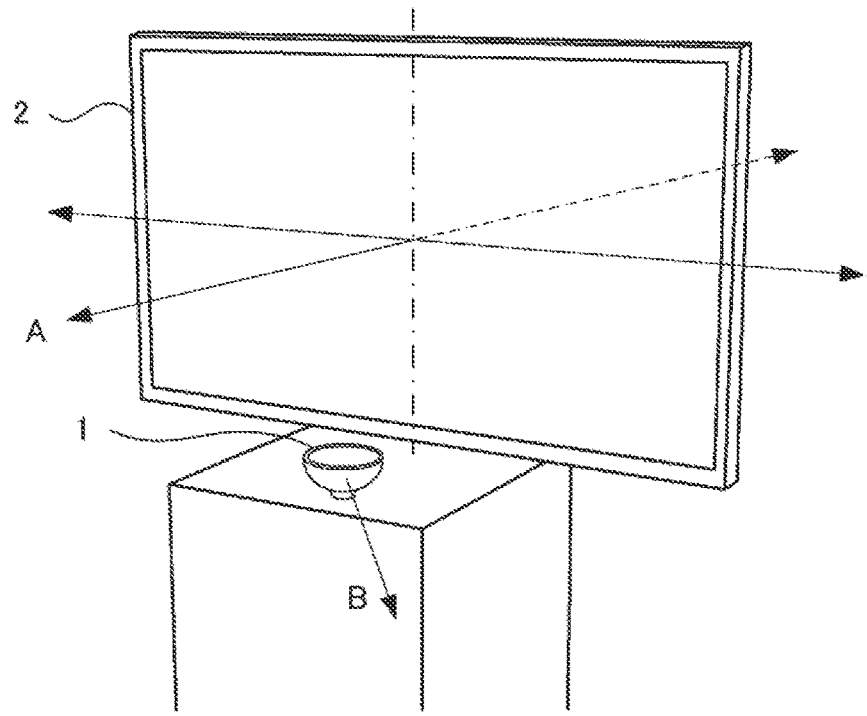
FIG. 4A is a view illustrating an example of a method for setting a facing orientation of the operation device according to an embodiment of the present disclosure.

For example, the orientation setter 111 may use a geomagnetic sensor (compass) provided on the operation device 1 to set the facing orientation. For example, as illustrated in FIG. 4A, the display device 2 is positioned in advance so as to face a predetermined direction A, and the operation device 1 is placed at the front of the display device 2 for a predetermined time (for example, five seconds). Then, the orientation setter 111 calculates the front direction of the operation device 1 with respect to the display device 2 based on the relative relationship between the direction A of the display device 2 and a direction B (N pole) of the geomagnetic sensor. As a result, the orientation setter 111 sets the orientation of the operation device 1 to the facing orientation.

Figure 4B:
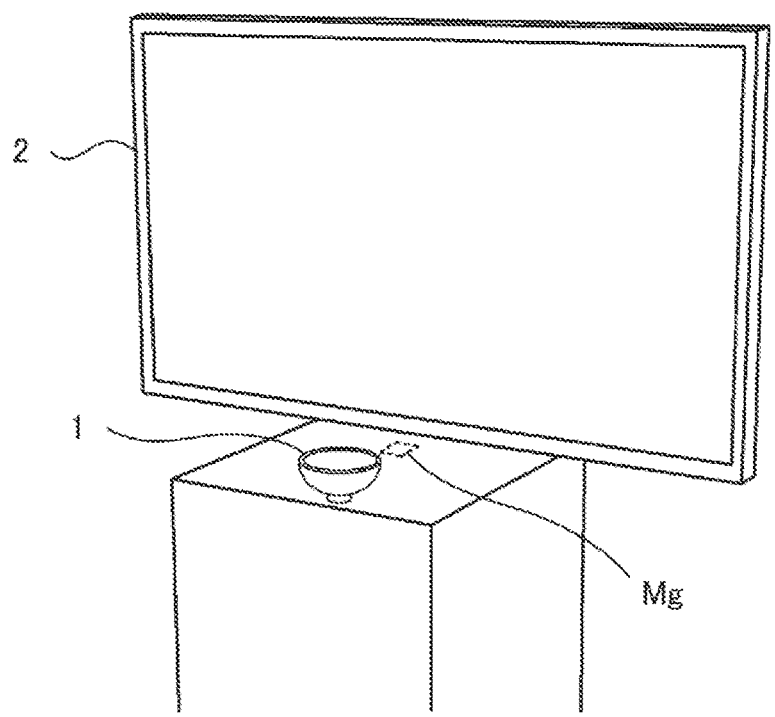
FIG. 4B is a view illustrating an example of the method for setting the facing orientation of the operation device according to the embodiment of the present disclosure.

Further, for example, the orientation setter 111 may use a geomagnetic sensor (compass) provided on the operation device 1 and a magnet Mg disposed in front of the display device 2 to set the facing orientation. For example, as illustrated in FIG. 4B, the magnet Mg is arranged in front of the display device 2, and the operation device 1 is placed in front of the magnet Mg for a predetermined time (for example, five seconds). Then, the geomagnetic sensor detects the direction of the magnet Mg, and the orientation setter 111 calculates the front direction of the operation device 1 with respect to the display device 2 based on the direction detected by the geomagnetic sensor. As a result, the orientation setter 111 sets the orientation of the operation device 1 to the facing orientation.

Figure 4C:
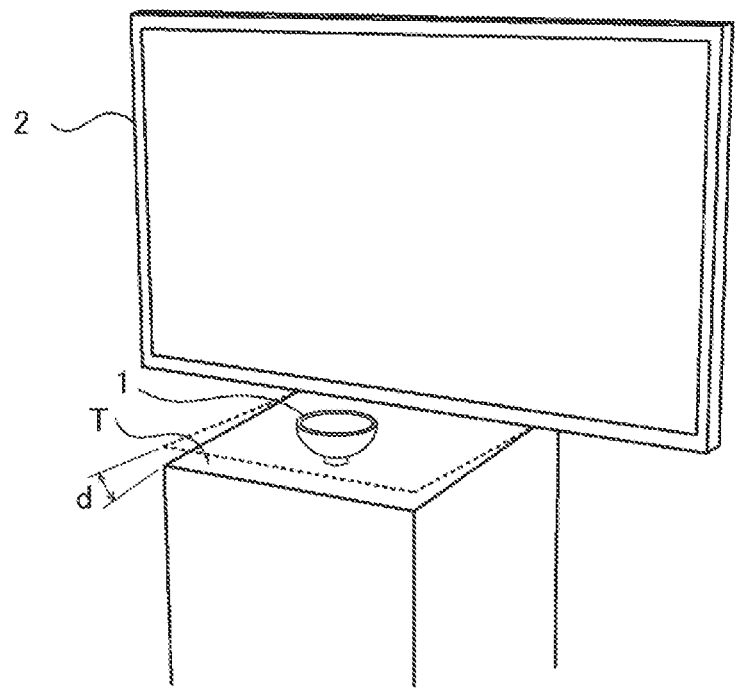
FIG. 4C is a view illustrating an example of the method for setting the facing orientation of the operation device according to the embodiment of the present disclosure.

Further, for example, the orientation setter 111 may use an acceleration sensor provided on the operation device 1 to set the facing orientation. For example, as illustrated in FIG. 4C, an inclined table T, which is inclined by an angle d (for example, five degrees) toward the display device 2, is installed in front of the display device 2, and the operation device 1 is placed on the inclined table T for a predetermined time (for example, five seconds). Note that the dotted line in FIG. 4C represents the position of the horizontal table. Then, the acceleration sensor detects acceleration in the X-axis, Y-axis, and Z-axis, and the orientation setter 111 calculates the front direction of the operation device 1 with respect to the display device 2 based on each acceleration detected by the acceleration sensor. As a result, the orientation setter 111 sets the orientation of the operation device 1 to the facing orientation.

Further, for example, the orientation setter 111 may set the orientation of the operation device 1 when the user presses a calibration button (not illustrated) provided on the operation device 1 to the facing orientation. For example, the user grips and positions the operation device 1 so that the operation device 1 faces the front direction of the user. Note that the terms "hold" and "grip" are interchangeable. Thereafter, when the user presses the calibration button, the orientation setter 111 sets the orientation of the operation device 1 at that time to the facing orientation. Note that the function of the calibration button may be replaced with a predetermined operation to the operation device 1. For example, when the user positions the operation device 1 and then shakes the operation device 1 in a predetermined direction, the orientation setter 111 sets the orientation of the operation device 1 at that time to the facing orientation.

Further, for example, the orientation setter 111 may set the facing orientation by using a camera (not illustrated) provided in the operation device 1. For example, the camera images the user and the surrounding environment such as the ceiling, floor and wall around the user, and the orientation setter 111 calculates the front direction of the operation device 1 with respect to the display device 2 based on the captured image acquired from the camera. As a result, the orientation setter 111 sets the orientation of the operation device 1 to the facing orientation.

As described above, the orientation setter 111 can set the front direction (facing orientation) of the operation device 1 by various methods. Further, the orientation setter 111 can set the facing orientation every time the user places the operation device 1 at a predetermined position. Note that when the front, back or other orientation is set to the operation device 1 itself, the orientation setter 111 sets the facing orientation in consideration of the orientation of the operation device 1. For example, when the operation device 1 is placed at a predetermined position so as to face the user side (the front side of the display device 2), the orientation setter 111 sets the facing orientation. As a result, the display device 2 can display the object image 3 so that the object image 3 faces the user side (the front side of the display device 2). Further, the orientation setter 111 may detect the orientation of the operation device 1 placed at a predetermined position, and set the facing orientation. In this case, the display device 2 displays the object image 3 so that the orientation of the object image 3 is the same as the orientation of the operation device 1.

When the user changes the orientation of the operation device 1, the orientation detector 112 detects the orientation change of the operation device 1. Specifically, the orientation detector 112 detects the orientation change of the operation device 1 based on the detection signal acquired from the orientation detection sensor 13. The orientation detector 112 is an example of an orientation detector of the present disclosure.

For example, as illustrated in FIG. 1, when the user desires to change the orientation of the object image 3 displayed on the display device 2, the user holds and rotates the operation device 1 in the right direction D1 or the left direction D2. In this case, the orientation detector 112 detects the orientation change (right rotation or left rotation) of the operation device 1 based on the detection signal acquired from the orientation detection sensor 13.

Further, for example, as illustrated in FIG. 1, when the user desires to change the size (display magnification) of the object image 3 displayed on the display device 2 (for example, desires to enlarge the object image 3), the user holds and moves the operation device 1 to the front side. In this case, the orientation detector 112 detects the orientation change (movement toward the front side) of the operation device 1 based on the detection signal acquired from the orientation detection sensor 13.

When the orientation detector 112 detects the orientation change of the operation device 1, the orientation detector 112 outputs information (orientation information) corresponding to the orientation change from the facing orientation to the display device 2. The orientation information includes information such as a rotation angle, a tilt angle, a coordinate, and a display magnification (enlargement ratio, reduction ratio).

Display Device 2

As illustrated in FIG. 2, the display device 2 includes a controller 21, a storage 22, a display 23, a position detection sensor 24, a communicator 25, and the like. The display device 2 may be an information processing device such as a personal computer, for example.

The communicator 25 is a communication interface for connecting the display device 2 to the communication network N1 by wire or wirelessly and executing data communication according to a predetermined communication protocol with an external device such as the operation device 1 through the communication network N1.

The position detection sensor 24 detects the position of the operation device 1 with respect to the display device 2. Specifically, the position detection sensor 24 detects the position (X, Y and Z coordinates) of the operation device 1 with the installation location of the position detection sensor 24 as a reference (coordinate origin), for example. For example, the position detection sensor 24 detects the distance and position to the operation device 1 by irradiating infrared rays to the operation device 1 and detecting the reflected light from the operation device 1. Note that the position detection sensor 24 may be a camera. In this case, the position detection sensor 24 detects the distance and position to the operation device 1 based on the image captured by the camera. The position detection sensor 24 may be provided outside the display device 2. For example, the position detection sensor 24 may be provided on the ceiling or wall of the room where the operation device 1 and the display device 2 are installed.

The display 23 is a liquid crystal display or an organic electro luminescence (EL) display for displaying various kinds of information. The display 23 displays, for example, the object image 3. Note that the display device 2 may include an operator (not illustrated) such as a mouse, a keyboard, or a touch panel for receiving various operations.

The storage 22 is a non-volatile storage such as an HDD, an SSD, or a flash memory for storing various kinds of information. Data (three-dimensional image data) of the object image 3 displayed on the display 23 is stored in the storage 22.

Further, a control program such as a display control program for causing the controller 21 to execute display control processing (see FIG. 12) to be described later is stored in the storage 22. For example, the display control program is non-temporarily recorded on a computer-readable recording medium such as an USB, a CD, or a DVD. Then, the display control program is read by a reading device (not illustrated) such as a USB drive, a CD drive or a DVD drive electrically connected to the display device 2, and is then stored in the storage 22. Further, the display control program may be downloaded from a server accessible from the display device 2 and then stored in the storage 22.

The controller 21 includes control devices such as a CPU, a ROM, and a RAM. The CPU is a processor for executing various kinds of arithmetic processing. The ROM is a non-volatile storage in which control programs such as a BIOS and an OS for causing the CPU to execute various processing are stored in advance. The RAM is a volatile or non-volatile storage for storing various kinds of information, and is used as a temporary storage memory (work area) for various kinds of processing executed by the CPU. Then, the controller 21 controls the display device 2 by executing various control programs stored in the ROM or the storage 22 in advance by the CPU.

Specifically, as illustrated in FIG. 2, the controller 21 includes various types of processors such as a display processor 211, an orientation controller 212, a marker detector 213, an information presenter 214, and a cross-section display 215. Note that the controller 21 functions as the display processor 211, the orientation controller 212, the marker detector 213, the information presenter 214, and the cross-section display 215 by executing various processing according to the display control program by the CPU. Further, a part or all of the processors in the controller 21 may be configured by an electronic circuit. Note that the display control program may be a program for causing a plurality of processors to function as the various types of processors.

The display processor 211 causes the display 23 to display various kinds of information. For example, the display processor 211 causes the display 23 to display the object image 3 (see FIG. 1).

The orientation controller 212 receives the orientation information from the operation device 1, and executes processing corresponding to the orientation information on the object image 3 displayed on the display 23. Specifically, the orientation controller 212 changes the orientation of the object image 3 in accordance with the orientation change of the operation device 1. The orientation controller 212 changes the orientation of the object image 3, based on the rotation angle of the operation device 1 corresponding to the orientation change of the operation device 1 and the position of the operation device 1 with respect to the display device 2. The orientation controller 212 is an example of an orientation controller of the present disclosure.

For example, when the user moves the operation device 1, the orientation detector 112 of the operation device 1 outputs orientation information including information such as a rotation angle, a tilt angle, coordinates, and a display magnification acquired from the orientation detection sensor 13 to the display device 2. When the orientation controller 212 receives the orientation information, the orientation controller 212 changes the rotation angle, the tilt angle, the coordinates, the display magnification, and the like of the object image 3 based on the orientation information. Note that when the front, back or other orientation is set to the operation device 1 itself, the orientation controller 212 changes the rotation angle, the tilt angle, the coordinates, the display magnification, and the like of the object image 3 in a state where the orientation of the operation device 1 matches the orientation of the object image 3. Further, the orientation controller 212 may calculate the display coordinates and the display magnification of the object image 3 based on the detection signal from the position detection sensor 24.

Figure 5:
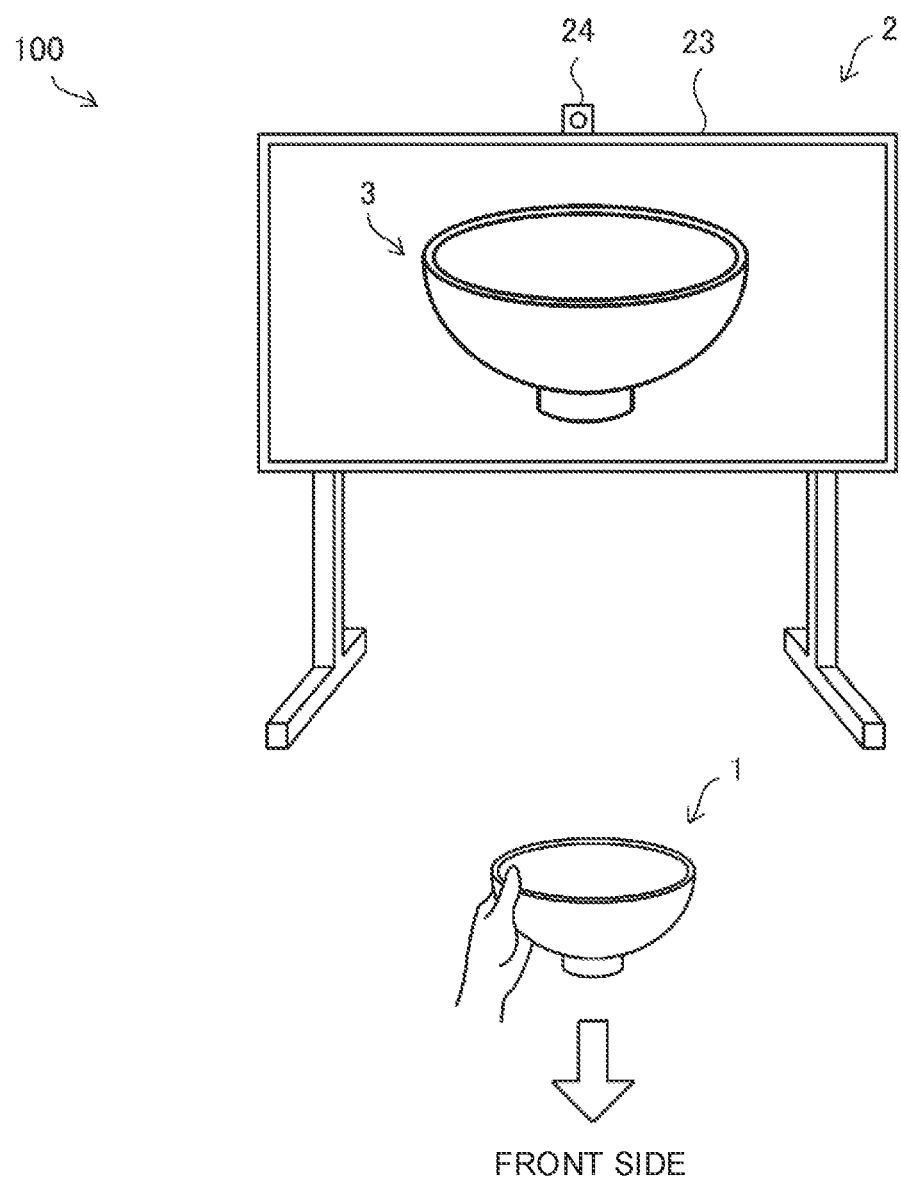
FIG. 5 is a view illustrating an example of an object image displayed on a display device according to the embodiment of the present disclosure.
Figure 6:
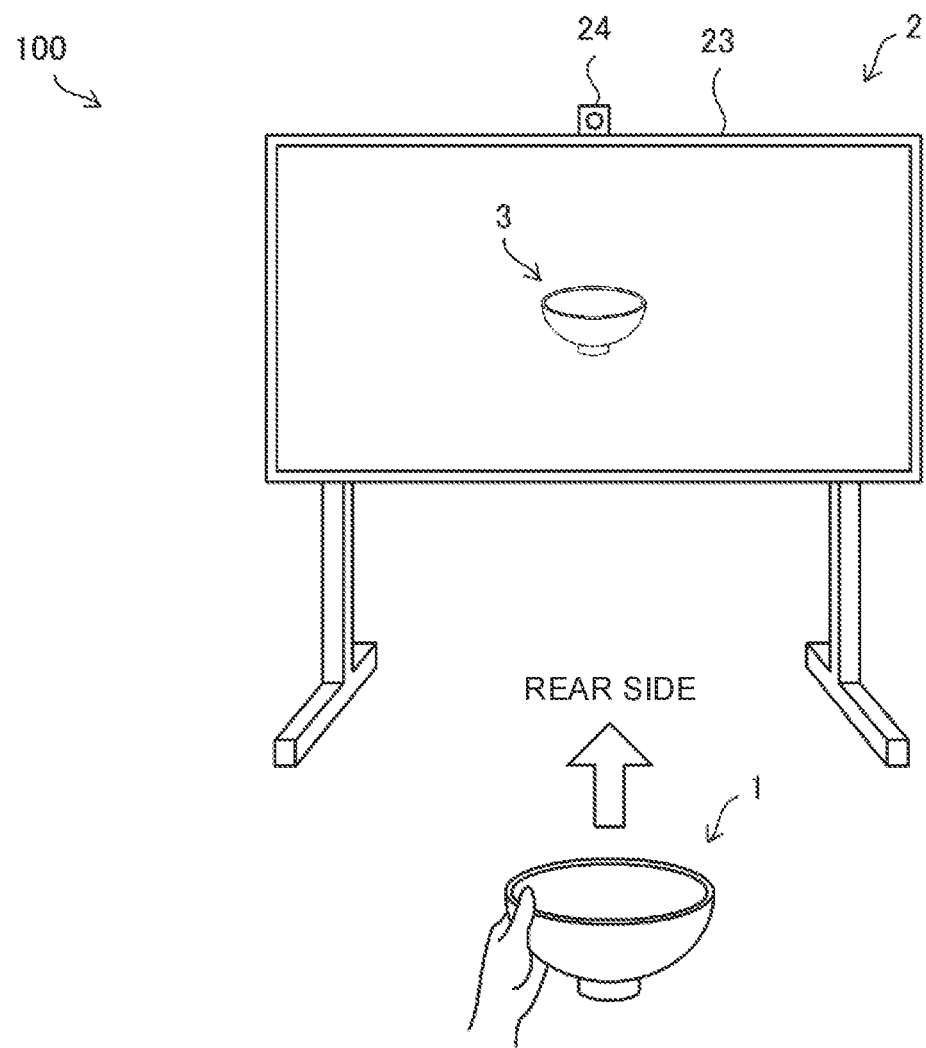
FIG. 6 is a view illustrating an example of the object image displayed on the display device according to the embodiment of the present disclosure.

For example, as illustrated in FIG. 5, when the user moves the operation device 1 to the front side so as to bring the operation device 1 closer to her or his face, the orientation controller 212 calculates the enlargement ratio corresponding to the movement amount, and changes (enlarges) the display magnification of the object image 3. Further, for example, as illustrated in FIG. 6, when the user moves the operation device 1 to the rear side so as to move the operation device 1 away from her or his face, the orientation controller 212 calculates the reduction ratio corresponding to the movement amount, and changes (reduces) the display magnification of the object image 3.

The orientation controller 212 controls the orientation (display state) of the object image 3 displayed on the display 23 so that the orientation of the object image 3 matches the orientation of the operation device 1 visible to the user. Therefore, for example, when the user turns the bottom of the tea bowl (operation device 1) toward the user herself or himself, the orientation controller 212 rotates the tea bowl of the object image 3 so that the bottom of the tea bowl faces the user.

Note that the orientation controller 212 may also have the function of the orientation detector 112 of the operation device 1. In this case, the orientation detector 112 may be omitted from the operation device 1.

Figure 7:
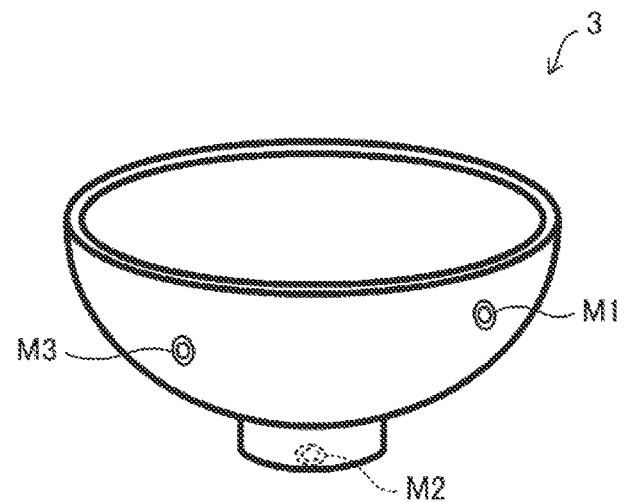
FIG. 7 is a view illustrating an example of a marker of the object image displayed on the display device according to the embodiment of the present disclosure.

The marker detector 213 detects a marker M set at a specific position of the object image 3. For example, as illustrated in FIG. 7, a plurality of markers M1, M2 and M3 are set on the object image 3 at each predetermined specific position. The number of markers M is not necessarily limited to plural, and may be one. For example, an exhibitor who exhibits a tea bowl at an exhibition sets a marker M at a characteristic portion of the tea bowl. Each marker M is displayed on the display device 2 so as to be distinguishable from the object image 3. For example, the marker M is displayed by lighting or blinking on the display device 2.

Figure 8:
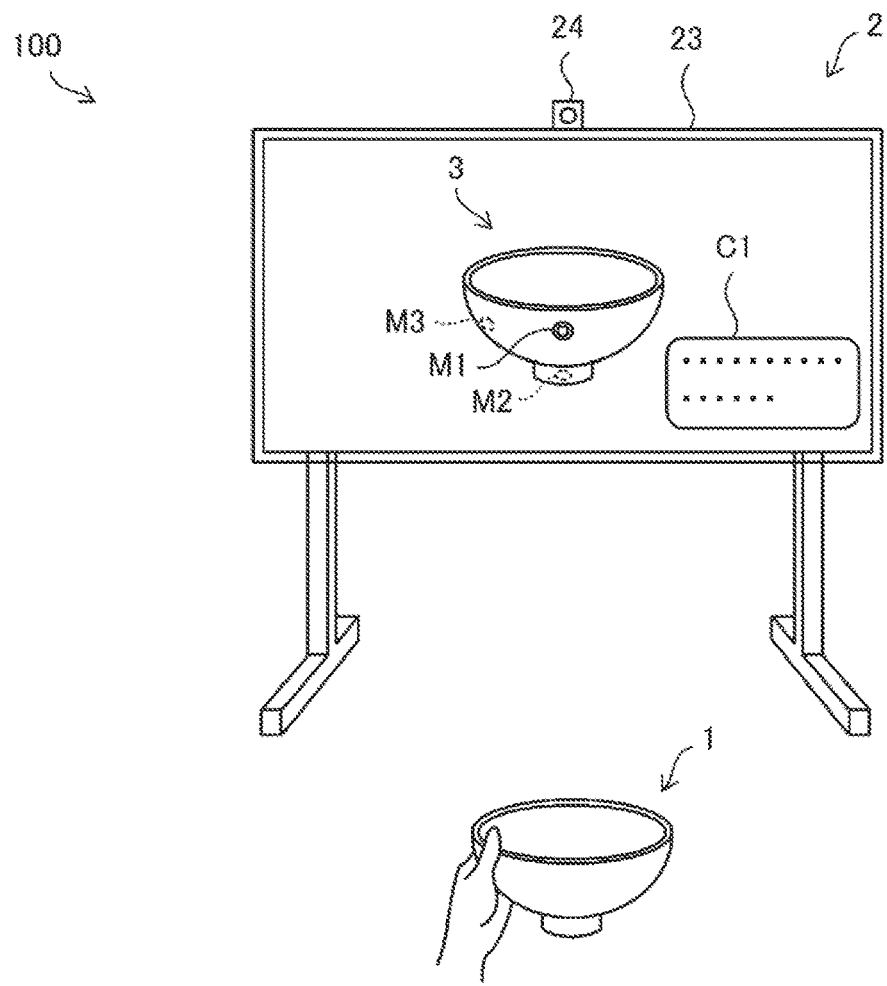
FIG. 8 is a view illustrating an example of the object image displayed on the display device according to the embodiment of the present disclosure.

Specifically, the marker detector 213 detects the marker M when the marker M faces the front direction of the display device 2 by changing of the orientation of the object image 3 according to the orientation change of the operation device 1. For example, as illustrated in FIG. 8, the user rotates the operation device 1 so that the marker M1 of the object image 3 displayed on the display device 2 faces the front direction. When the object image 3 rotates in association with the rotation of the operation device 1 and the orientation of the marker M1 coincides with the front direction, specifically, when the direction perpendicular to the portion (surface) of the object image 3 to which the marker M1 is attached matches the direction perpendicular to the display surface of the display 23, the marker detector 213 detects the marker M1.

When the marker detector 213 detects the marker M, the information presenter 214 presents the specific information associated with the specific position. For example, in the example illustrated in FIG. 8, when the marker detector 213 detects the marker M1, the information presenter 214 displays specific information C1 associated with the marker M1 on the display 23. Similarly, when the marker detector 213 detects the marker M2, the information presenter 214 displays specific information C2 associated with the marker M2 on the display 23. Further, when the marker detector 213 detects the marker M3, the information presenter 214 displays specific information C3 associated with the marker M3 on the display 23. The specific information C1, C2 and C3 are, for example, information such as descriptions and explanations about the tea bowl, and register different information. The specific information C may be text information. Further, the specific information C may be image information such as a photograph or an illustration. Each marker M and each specific information C are stored in the storage 22 in association with each other.

Each time the marker detector 213 detects the marker M, the information presenter 214 presents the corresponding specific information C.

Here, when the marker detector 213 detects the marker M, the marker detector 213 may register information indicating that the marker M has been detected in the storage 22. For example, the marker detector 213 registers the detection status indicating "detected" and "undetected" for each marker M. The marker detector 213 does not re-detect the detected marker M. Therefore, when the marker M is detected once and the information presenter 214 presents the corresponding specific information C, the specific information C is not re-presented. When the marker detector 213 detects the marker M, the marker detector 213 may delete the detected marker M from the object image 3. When the operation device 1 is placed at a predetermined position, the marker detector 213 resets the detection status. According to this configuration, for example, when the user A appreciates a tea bowl and views all of the specific information C1, C2 and C3, the specific information C1, C2 and C3 are not re-presented to the user A. Thereafter, when the user A returns the operation device 1 to the predetermined position, and the user B starts to appreciate the tea bowl, the specific information C1, C2 and C3 are presented.

Note that the information presenter 214 may output the specific information C by voice. For example, when the marker detector 213 detects the marker M1, the information presenter 214 causes a speaker (not illustrated) to output the text information of the specific information C1 associated with the marker M1 by voice. The speaker may be provided on the display device 2 or the operation device 1.

Further, the marker M may be displayed only on the object image 3, on both the object image 3 and the operation device 1, or only on the operation device 1.

Figure 9:
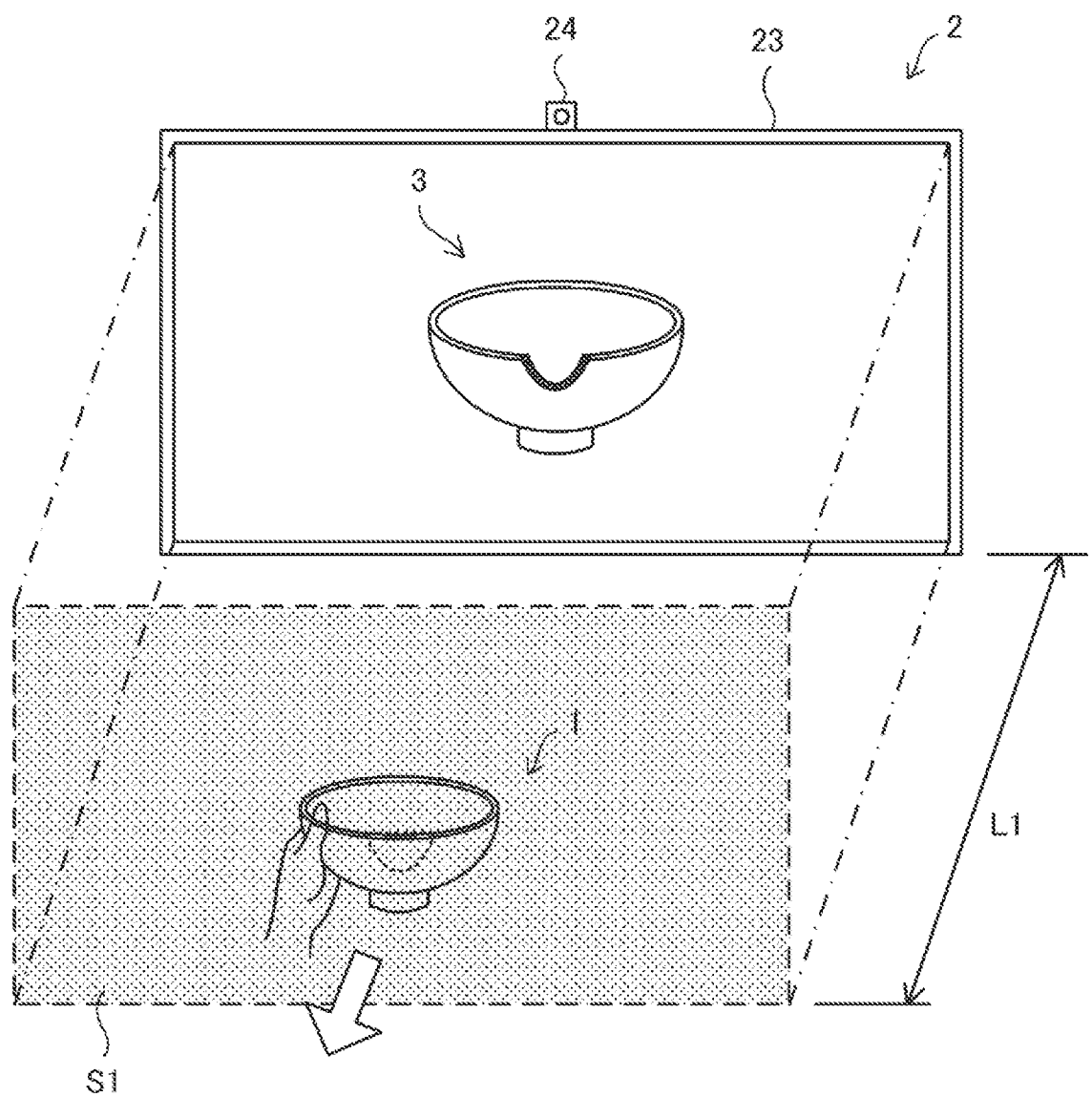
FIG. 9 is a view illustrating an example of the object image displayed on the display device according to the embodiment of the present disclosure.

When the operation device 1 moves in a direction away from the display device 2 so that the operation device 1 overlaps a virtual plane S1 at a position separated from the display device 2 by a predetermined distance L1, the cross-section display 215 causes the display 23 to display the object image 3 including a cut plane obtained by cutting the operation device at the virtual plane S1. Specifically, first, as illustrated in FIG. 9, the controller 21 sets the virtual plane S1 at a position separated by the predetermined distance L1. The predetermined distance L1 is preset by an administrator or the like and can be changed as appropriate. The predetermined distance L1 is registered in the storage 22. The controller 21 identifies the position of the operation device 1 based on the detection result of the position detection sensor 24, and displays the cross section of the object image 3 when the operation device 1 exceeds the predetermined distance L1. Note that the dotted line of the operation device 1 illustrated in FIG. 9 represents the cutting position by the virtual plane S1. The cross-section display 215 is an example of a cross-section display of the present disclosure.

For example, when all the markers M set on the object image 3 are detected, and all the specific information C is presented, the controller 21 enables a cross-section display mode in which the cross-section of the object image 3 can be displayed. While the cross-section display mode is disabled, the controller 21 changes the display magnification of the object image 3 in accordance with the movement of the operation device 1 (see FIGS. 5 and 6).

Figure 10:
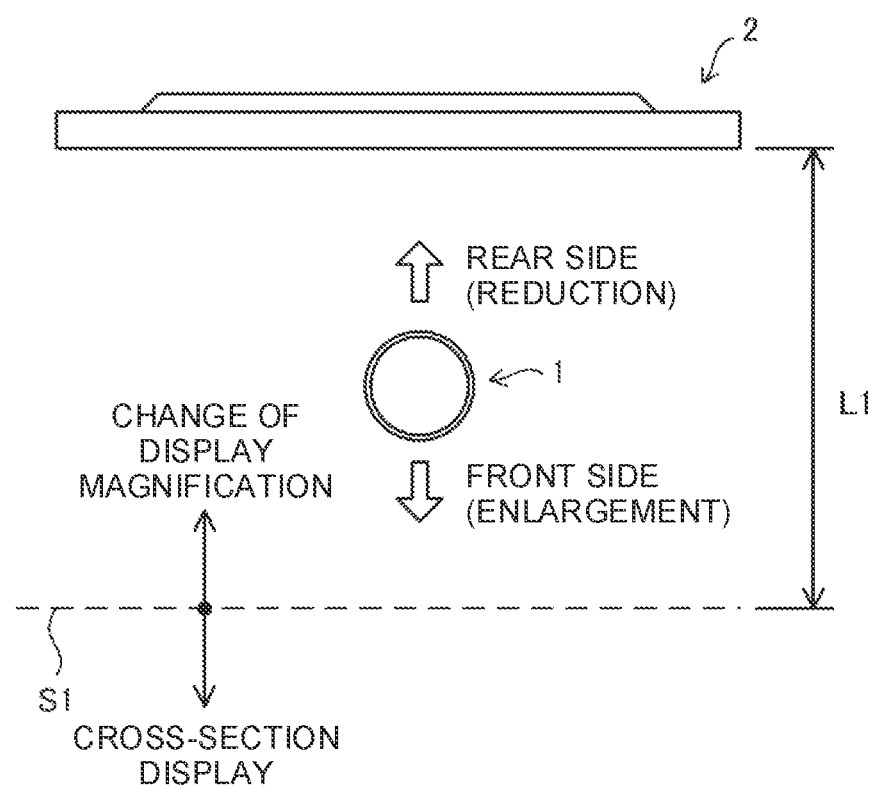
FIG. 10 is a view for explaining a cross-section display mode in the display control system according to the embodiment of the present disclosure.

When the cross-section display mode is enabled, as illustrated in FIG. 10, the controller 21 changes the display magnification of the object image 3 when the operation device 1 moves within the range of the predetermined distance L1 from the display device 2, and displays the cross section of the object image 3 when the operation device 1 exceeds the range of the predetermined distance L1 from the display device 2 so that the operation device 1 overlaps the virtual plane S1. For example, within the range of the predetermined distance L1, the orientation controller 212 displays the object image 3 with a reduced size when the operation device 1 approaches the display device 2, and displays the object image 3 with an enlarged size when the operation device 1 moves away from the display device 2. On the other hand, when the distance exceeds the range of the predetermined distance L1, the cross-section display 215 causes the display 23 to display the object image 3 including the cut plane obtained by cutting the operation device 1 at the virtual plane S1. Further, when the distance exceeds the range of the predetermined distance L1, the orientation controller 212 displays the object image 3 at a preset magnification. That is, when the distance exceeds the range of the predetermined distance L1, the orientation controller 212 changes the cutting position of the object image 3 in accordance with the movement of the operation device 1 and does not change the display magnification.

Figure 11:
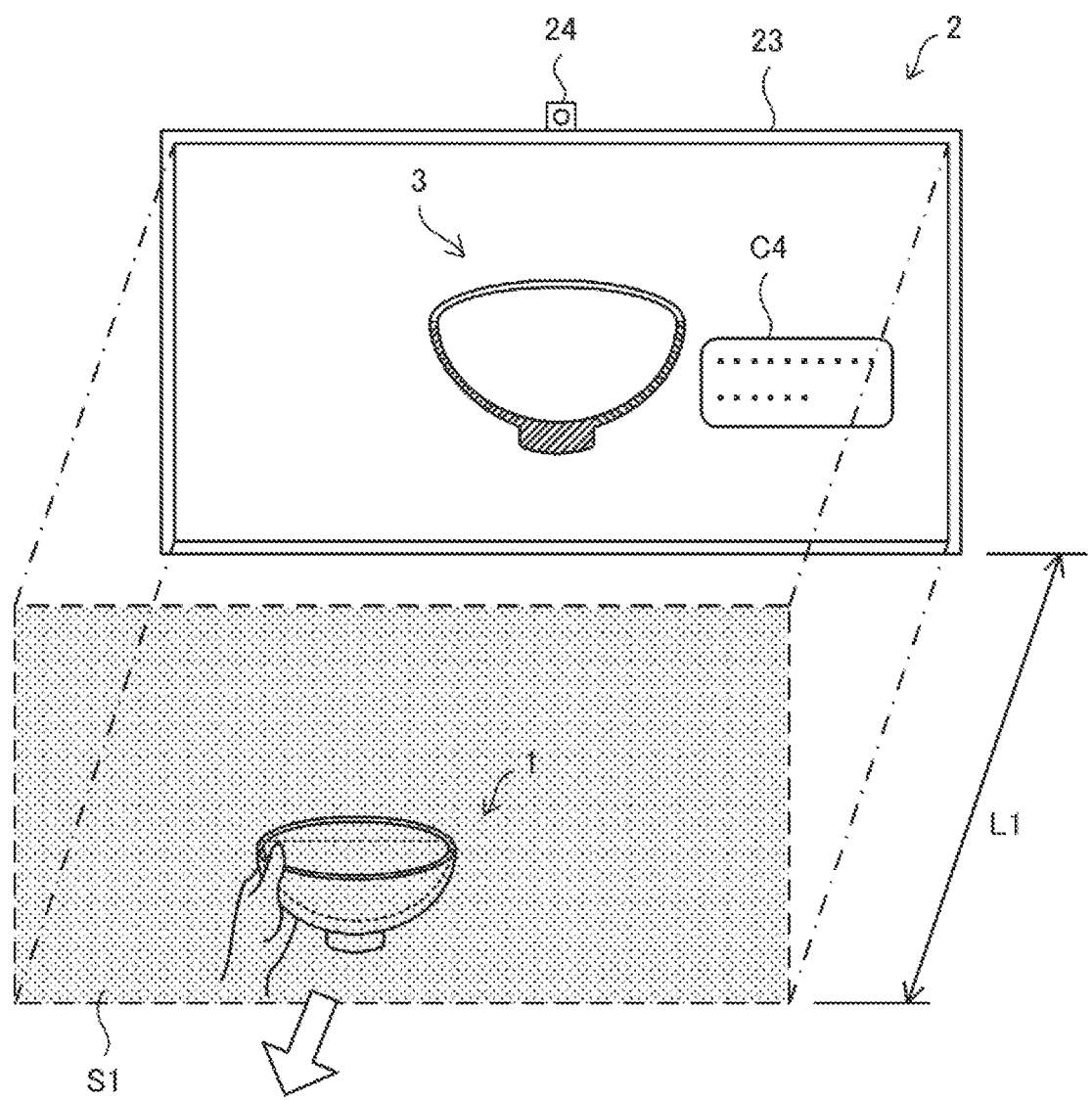
FIG. 11 is a view illustrating an example of the object image displayed on the display device according to the embodiment of the present disclosure.

Further, when the virtual plane S1 cuts a predetermined position of the operation device 1, the information presenter 214 may present specific information C4 associated with the predetermined position. For example, as illustrated in FIG. 11, when the virtual plane S1 cuts an intermediate position of the operation device 1, the cross-section display 215 displays the object image 3 including the cross section cut at the intermediate position, and the information presenter 214 presents the specific information C4 associated with the intermediate position. Note that when the virtual plane S1 overlaps the marker M described above (see FIG. 7), the information presenter 214 may present the specific information C associated with the marker M. The information presenter 214 is an example of an information presenter of the present disclosure.

Display Control Processing

Figure 12:
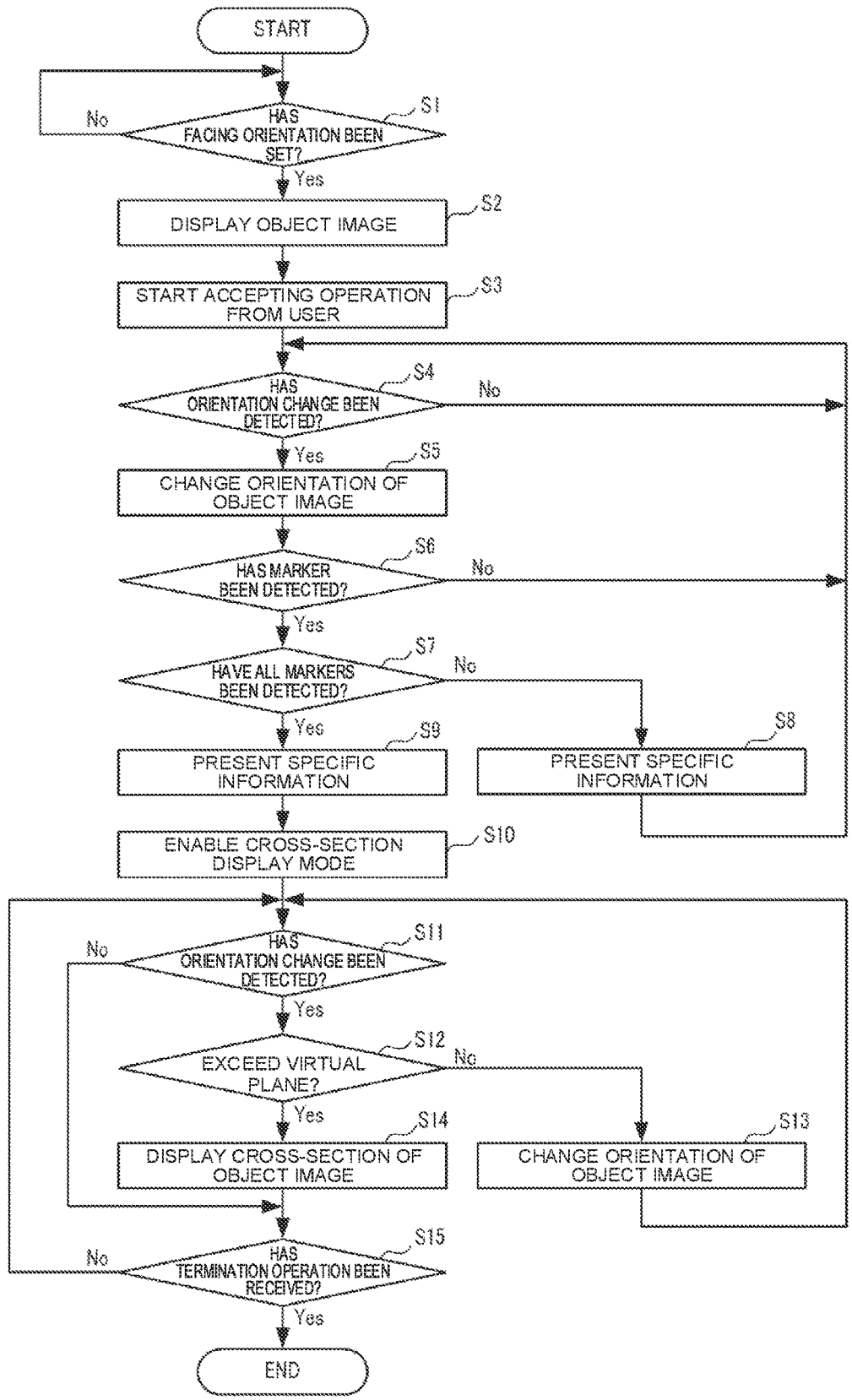
FIG. 12 is a flowchart illustrating an example of a procedure of display control processing executed by the operation device according to the embodiment of the present disclosure.

Next, display control processing executed in the display control system 100 will be described with reference to FIG. 12. Specifically, in the present embodiment, the display control processing is executed by the controller 11 of the operation device 1 and the controller 21 of the display device 2. Note that the controllers 11 and 21 may terminate the display control processing in the middle by a predetermined operation of the operation device 1 or the display device 2.

Note that the present disclosure can be regarded as a disclosure of a display control method (an example of a display control method of the present disclosure) for executing one or a plurality of steps included in the display control processing. Further, one or a plurality of steps included in the display control processing described herein may be appropriately omitted. It should be noted that each step in the display control processing may be executed in a different order within a range in which the similar effect is produced. Furthermore, although the case where the controllers 11 and 21 execute the respective steps in the display control processing will be described as an example, a display control method in which a plurality of processors execute the respective steps in the display control processing in a distributed manner is also considered as another embodiment.

Here, the operation device 1 can operate the object image 3 displayed on the display device 2 by activating a dedicated application.

First, in step S1, the controller 11 of the operation device 1 determines whether the orientation of the operation device 1 is set to the facing orientation (front direction). Specifically, the controller 11 activates the dedicated application, and sets the orientation of the operation device 1 at the position which is the front of the operation device 1 to the facing orientation.

The controller 11 sets the facing orientation based on the position coordinates and the inclination acquired from the orientation detection sensor 13. For example, when the operation device 1 is placed at a predetermined position, the controller 11 sets the facing orientation.

When the operation device 1 is set to the facing orientation (S1: Yes), the processing proceeds to step S2. The controller 11 waits until the operation device 1 is set to the facing orientation (S1: No).

In step S2, the controller 21 of the display device 2 causes the display 23 to display the object image 3 in a predetermined direction corresponding to the facing orientation.

In step S3, the controller 11 of the operation device 1 starts accepting an operation from the user to the operation device 1. Thus, the user (viewer) can operate the object image 3 using the operation device 1.

In step S4, the controller 11 of the operation device 1 determines whether the orientation change of the operation device 1 has been detected. Specifically, the controller 11 detects the presence or absence of the orientation change of the operation device 1 based on the detection signal acquired from the orientation detection sensor 13. For example, as illustrated in FIG. 1, when the user rotates the operation device 1 in the right direction D1, the controller 11 detects the orientation change (right rotation) of the operation device 1 based on the detection signal acquired from the orientation detection sensor 13. Further, for example, as illustrated in FIG. 5, when the user moves the operation device 1 to the front side, the controller 11 detects the orientation change (position change) of the operation device 1 based on the detection signal acquired from the orientation detection sensor 13. When the controller 11 detects the orientation change of the operation device 1 (S4: Yes), the processing proceeds to step S5. The controller 11 waits until the orientation change of the operation device 1 is detected (S4: No). Step S4 is an example of an orientation detection step of the present disclosure.

In step S5, the controller 21 of the display device 2 changes the orientation of the object image 3 displayed on the display device 2 according to the orientation change of the operation device 1. Specifically, the controller 11 of the operation device 1 outputs the orientation information including the rotation angle, the tilt angle, the coordinates, the display magnification, and the like acquired from the orientation detection sensor 13 to the display device 2. When the controller 21 of the display device 2 receives the orientation information, the controller 21 of the display device 2 changes the rotation angle, the tilt angle, the coordinates, the display magnification, and the like of the object image 3 based on the orientation information (see FIGS. 5 and 6). Step S5 is an example of an orientation control step of the present disclosure.

In step S6, the controller 21 of the display device 2 determines whether a marker M set at the specific position of the object image 3 has been detected. For example, when three markers M1, M2 and M3 are set on the object image 3 (see FIG. 7), the controller 21 determines whether any one marker M has been detected. When the controller 21 detects a marker M (S6: Yes), the processing proceeds to step S7. When the controller 21 does not detect any marker M (S6: No), the processing returns to step S4. Step S6 is an example of a marker detection step of the present disclosure.

In step S7, the controller 21 of the display device 2 determines whether all the markers M have been detected. For example, the controller 21 determines whether all the markers M1, M2 and M3 set on the object image 3 have been detected by referring to the detection status of the storage 22. When the controller 21 has not detected all the markers M (S7: No), the processing proceeds to step S8. On the other hand, when the controller 21 has detected all the markers M (S7: Yes), the processing proceeds to step S9.

In step S8, the controller 21 presents the specific information C associated with the detected marker M. For example, when the controller 21 detects the marker M1, the controller 21 displays the specific information C1 associated with the marker M1 on the display 23 (see FIG. 8). Step S8 is an example of an information presentation step of the present disclosure.

In step S9, the controller 21 presents the specific information C associated with the detected marker M as in step S8. In step S9, the controller 21 presents the specific information C associated with the marker M detected last among the plural markers M set on the object image 3. By repeating steps S4 to S8, all of the specific information C1 associated with the marker M1, the specific information C2 associated with the marker M2, and the specific information C3 associated with the marker M3 are sequentially presented to the user. When all the markers M are detected and all the specific information C is presented, the processing proceeds to step S10.

In step S10, the controller 21 enables the cross-section display mode. When the cross-section display mode is enabled, the controller 21 displays the cross-section of the object image 3 on the display 23 when the following conditions are satisfied.

In step S11, the controller 11 of the operation device 1 determines whether the orientation change of the operation device 1 has been detected. For example, as illustrated in FIG. 5, when the user moves the operation device 1 to the front side, the controller 11 detects the orientation change (position change) of the operation device 1 based on the detection signal acquired from the orientation detection sensor 13. When the controller 11 detects the orientation change of the operation device 1 (S11: Yes), the processing proceeds to step S12. When the controller 11 does not detect the orientation change of the operation device 1 (S11: No), the processing proceeds to step S15.

In step S12, the controller 21 of the display device 2 determines whether the operation device 1 exceeds the virtual plane S1 (or whether the operation device 1 overlaps the virtual plane S1). Specifically, the controller 21 specifies the position of the operation device 1 based on the detection result of the position detection sensor 24, and determines whether the tip of the operation device 1 exceeds the predetermined distance L1 from the display device 2. When the operation device 1 does not exceed the virtual plane S1 (S12: No), the processing proceeds to step S13. On the other hand, when the operation device 1 exceeds the virtual plane S1 (S12: Yes), the processing proceeds to step S14.

In step S13, the controller 21 of the display device 2 changes the orientation of the object image 3 displayed on the display device 2 according to the orientation change of the operation device 1. In this case, since the operation device 1 moves to, for example, the rear side or the front side within the range of the predetermined distance L1, the controller 21 displays the object image 3 with a reduced size when the operation device 1 approaches the display device 2, and displays the object image 3 with an enlarged size when the operation device 1 moves away from the display device 2. Thereafter, the processing returns to step S11. When the operation device 1 changes its orientation within the range of the predetermined distance L1, the processing of steps S11 to S13 is repeated. Step S13 is an example of an orientation control step of the present disclosure.

On the other hand, in step S14, the controller 21 causes the display 23 to display the object image 3 including the cut plane obtained by cutting the operation device 1 at the virtual plane S1 (see FIGS. 9 and 11). In this case, the controller 21 changes the cutting position to display the cross section of the object image 3 without changing the display magnification of the object image 3 in accordance with the movement of the operation device 1. Step S14 is an example of a cross-section display step of the present disclosure.

In step S15, the controller 21 determines whether the termination operation has been received from the user. For example, when the user places the operation device 1 at a predetermined place, the controller 21 determines that the termination operation has been received. When the controller 21 receives the termination operation (S15: Yes), the controller 21 ends the display control processing. The controller 21 repeats the processing of steps S1*l* to S14 until the termination operation is received (S15: No).

Note that, in the display control processing, when the predetermined position of the operation device 1 exceeds the virtual plane S1, that is, when the virtual plane S1 cuts off the predetermined position of the operation device 1, the controller 21 may present the specific information C4 associated with the predetermined position (see FIG. 11). The predetermined position may be an intermediate position of the operation device 1 or a position where the marker M (see FIG. 7) is provided. As described above, the controller 11 executes the display control processing.

Here, the display control system 100 may terminate the display control processing when a predetermined period of time has elapsed from the setting (step S1) of the facing orientation of the operation device 1. Thus, for example, when a plurality of viewers sequentially view an art object, each viewer can equally appreciate the art object. Further, the display control system 100 may terminate the display control processing when a predetermined period of time has elapsed since all the markers M have been detected (step S7). Thus, each viewer can browse all the specific information C.

Note that the display control processing described above is configured to enable the cross-section display mode (step S10) on the condition that all the markers M are detected (step S7). However, as another embodiment, the display control system 100 may enable the cross-section display mode when a predetermined operation by the user is received. For example, when the user presses a predetermined button (not illustrated) on the operation device 1 or the display device 2, when the user changes the orientation of the operation device 1 to a predetermined orientation, when the user gives a voice instruction or the like, the display control system 100 may enable the cross-section display mode.

As described above, the display control system 100 according to the present embodiment detects the orientation change of the operation device 1 when the user changes the orientation of the operation device 1, and changes the orientation of the object image 3 of the operation object displayed on the display device 2 according to the orientation change of the operation device 1. Further, the display control system 100 detects the marker M set at the specific position of the object image 3, and presents the specific information C associated with the detected marker M to the user (viewer). According to this configuration, it is possible to move the object image 3 in conjunction with the movement of the operation device 1. Furthermore, the user can browse information (specific information) relating to the operation object by moving the operation device 1.

Also, when the operation device 1 moves in the direction away from the display device 2 and overlaps the virtual plane S1 located at a predetermined distance away from the display device 2, the display control system 100 according to the present embodiment causes the display device 2 to display the object image 3 including the cut plane obtained by cutting the operation device 1 at the virtual plane S1. According to this configuration, the display control system 100 can display the cross-section information such as the thickness and the internal structure of the object image 3 in association with the movement of the operation device 1. Therefore, the user can browse the cross-section information relating to the operation object by moving the operation device 1.

The present disclosure is not limited to the embodiments described above. Other embodiments of the present disclosure will be described below.

In the embodiments described above, for example, when the user holds the operation device 1 and extends her or his arm, the relative position between her or his face and the operation device 1 is separated, so that the size of the operation device 1 as seen from the user becomes smaller. In this case, the object image 3 displayed on the display device 2 is displayed with a reduced size so as to reflect the size of the operation device 1 as seen from the user (see FIG. 6). Similarly, for example, when the user holds the operation device 1 and folds his or her arm, the relative position between her or his face and the operation device 1 approaches each other, so that the size of the operation device 1 as seen from the user becomes larger. In this case, the object image 3 displayed on the display device 2 is displayed with an enlarged size so as to reflect the size of the operation device 1 as seen from the user (see FIG. 5). As described above, when the relative position between the user and the operation device 1 changes by the user bending or stretching of her or his arm at a place (while the user is standing or sitting), the size of the operation device 1 as seen from the user is appropriately reflected on the object image 3.

However, for example, when the user moves (walks) while holding the operation device 1, it is conceivable that the size of the operation device 1 as seen from the user may not be appropriately reflected on the object image 3. For example, when the user approaches the display device 2 on foot while holding the operation device 1, the object image 3 is displayed with a reduced size even though the relative position between the user and the operation device 1 does not change and the size of the operation device 1 as seen from the user does not change. Similarly, for example, when the user moves away from the display device 2 on foot while holding the operation device 1, the object image 3 is displayed with an enlarged size even though the relative position between the user and the operation device 1 does not change and the size of the operation device 1 as seen from the user does not change. As described above, when the size of the operation device 1 as seen from the user is not appropriately reflected on the object image 3, there arises a problem that the operability of the operation device 1 and the visibility of the object image 3 are deteriorated.

Therefore, the display control system 100 according to another embodiment includes a configuration capable of solving the above problem in addition to the configuration of the embodiments described above.

Figure 13:
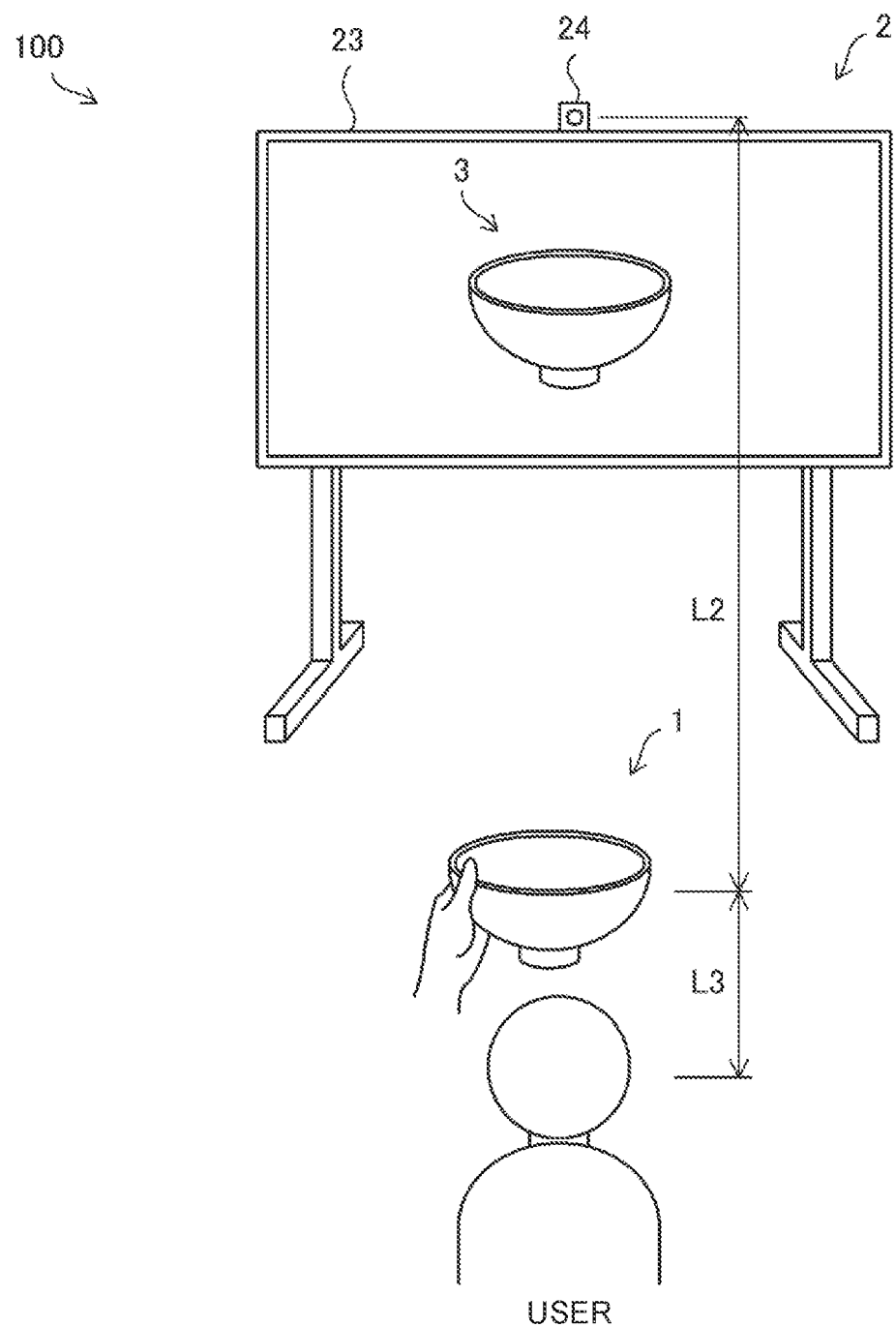
FIG. 13 is a view illustrating a relative position between the operation device and the user in the display control system according to the embodiment of the present disclosure.

Specifically, the position detection sensor 24 detects the position of the operation device 1 and the position of the user with respect to the display device 2. Specifically, the position detection sensor 24 detects the position (X, Y and Z coordinates) of the operation device 1 and the position (X, Y and Z coordinates) of the user with the position of the position detection sensor 24 as a reference (coordinate origin). The orientation controller 212 calculates the relative position between the operation device 1 and the display device 2 and the relative position between the operation device 1 and the user, based on the detection signal from the position detection sensor 24. For example, as illustrated in FIG. 13, the orientation controller 212 calculates a distance L2 between the operation device 1 and the display device 2 and a distance L3 between the operation device 1 and the user. Then, the orientation controller 212 changes the orientation of the object image 3 based on the distances L2 and L3.

For example, when the user grips the operation device 1 placed at a predetermined place, the orientation setter 111 sets the orientation of the operation device 1 to the facing orientation in which the operation device 1 faces the user. At this time, the orientation controller 212 sets the distance L3 between the operation device 1 and the user as a reference distance. Thereafter, for example, when the user extends her or his arm on the place and moves the operation device 1 to the rear side (display device 2 side), the distance L3 becomes larger than the reference distance. When detecting that the distance L3 is changed (increased), the orientation controller 212 displays object image 3 with a reduced size at a reduction ratio corresponding to the amount of change. Further, for example, when the user folds her or his arm on the place and moves the operation device 1 to the front side (user side), the distance L3 becomes smaller than the reference distance. When detecting that the distance L3 is changed (decreased), the orientation controller 212 displays the object image 3 with an enlarged size at a magnification ratio corresponding to the amount of change.

On the other hand, for example, when the user walks to the rear side (display device 2 side) while holding the operation device 1, the distance L3 does not substantially change from the reference distance, and only the distance L2 becomes smaller. In this case, the orientation controller 212 does not change the display magnification of the object image 3 on the condition that the change in the distance L3 is not detected. Similarly, for example, when the user walks to the front side (in a direction away from the display device 2) while holding the operation device 1, the distance L3 does not substantially change from the reference distance, and only the distance L2 becomes larger. In this case, the orientation controller 212 does not change the display magnification of the object image 3 on the condition that the change in the distance L3 is not detected.

According to this configuration, it is possible to appropriately reflect the size of the operation device 1 as seen from the user on the object image 3. Therefore, it is possible to prevent the operability of the operation device 1 and the visibility of the object image 3 from deteriorating. Note that when the controller 21 detects only the change of the distance L2 without detecting the change of the distance L3, the controller 21 may determine that the user is moving while holding the operation device 1 and display a predetermined message on the display 23. For example, the controller 21 may display a message prompting the user to move the operation device 1 while the user do not move, such as "Please move the replica closer to or away from your body (face)".

Figure 14:
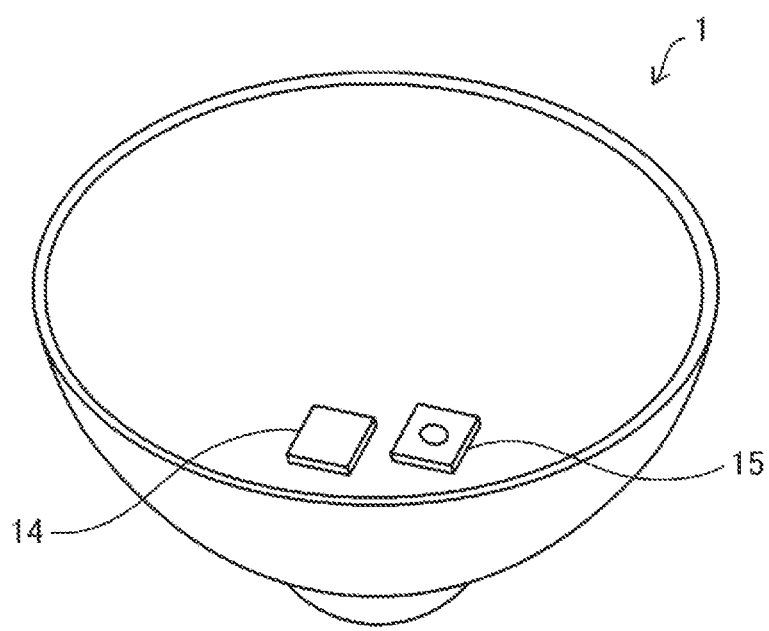
FIG. 14 is a view illustrating an appearance of the operation device according to the embodiment of the present disclosure.

As another embodiment of the present disclosure, the position detection sensor 24 may be mounted on the operation device 1. For example, as illustrated in FIG. 14, the operation device 1 may include a camera 15 which is an example of the position detection sensor 24. The camera 15 is disposed vertically upward so as to be capable of capturing an image of the ceiling of the room. The operation device 1 detects the position (coordinates) of the operation device 1 based on the captured image (ceiling image) by the camera 15. The operation device 1 outputs a detection signal (coordinate information) to the display device 2. When the display device 2 receives the detection signal, the display device 2 detects the orientation change of the operation device 1, and changes the orientation of the object image 3.

The operation object of the present disclosure is not limited to an art object, but may be an article in various fields. For example, the operation object may be an organ, a building, an ornament, or the like.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A display control system that changes an orientation of an object image of an operation object displayed on a display device in association with an orientation change of an operation device, the display control system comprising:
    a display processor that causes the display device to display the object image and causes a marker image to be displayed at a specific position on the object image, specific information about the object image being associated with the specific position on the object image; and
    an information presenter that presents the specific information associated with the specific position of the marker image when the marker image, in a display screen of the display device, faces a front direction of the display device by changing of the orientation of the object image in the display screen based on the orientation change of the operation device.

2. The display control system according to claim 1, wherein the display processor further causes the display device to display a first marker image associated with first specific information at a first position on the object image and to display a second marker image associated with second specific information at a second position on the object image, and
    the information presenter further presents the first specific information when the first marker image is detected by the marker detector, and presents the second specific information when the second marker image is detected by the marker detector.

3. The display control system according to claim 1, wherein the information presenter presents the specific information by causing the display device to display the specific information.

4. The display control system according to claim 1, wherein the information presenter presents the specific information by causing the specific information to be output via voice.

5. The display control system according to claim 1, further comprising:
    an orientation detector that detects the orientation change of the operation device when a user changes an orientation of the operation device; and
    an orientation controller that changes the orientation of the object image displayed on the display device according to the orientation change of the operation device,
    wherein the orientation controller changes the orientation of the object image based on a rotation angle of the operation device corresponding to the orientation change of the operation device and a position of the operation device relative to the display device.

6. The display control system according to claim 5, wherein the orientation controller further displays the object image with a reduced size when the operation device approaches the display device, and
    wherein the orientation controller further displays the object image with an enlarged size when the operation device moves away from the display device.

7. The display control system according to claim 1, wherein the operation object is an art object,
    wherein the object image is a three-dimensional image of the art object, and
    wherein the operation device is a replica of the art object.

8. A display control method for changing an orientation of an object image of an operation object displayed on a display device in association with an orientation change of an operation device, the display control method, executed by at least one processor, comprising:
    displaying, on the display device, the object image;
    displaying, on the display device, a marker image at a specific position on the object image, specific information about the object image being associated with the specific position on the object image; and
    presenting the specific information associated with the specific position of the marker image when the marker image, in a display screen of the display device, faces a front direction of the display device by changing of the orientation of the object image in the display screen based on the orientation change of the operation device.

9. A non-transitory computer-readable recording medium storing therein a display control program for changing an orientation of an object image of an operation object displayed on a display device in association with an orientation change of an operation device, the display control program including one or more instructions that, when executed by at least one processor, cause the at least one processor to:

display, on the display device, the object image;

display, on the display device, a marker image at a specific position on the object image, specific information about the object image being associated with the specific position on the object image; and present the specific information associated with the specific position of the marker image when the marker image, in a display screen of the display device, faces a front direction of the display device by changing of the orientation of the object image in the display screen based on the orientation change of the operation device.

* * * * *